United States Patent [19]

Sorensen

[11] Patent Number: 4,508,676
[45] Date of Patent: * Apr. 2, 1985

[54] CORE STABILIZATION BY SEQUENTIAL INJECTIONS

[76] Inventor: Jens O. Sorensen, P.O. Box 2274, Rancho Santa Fe, Calif. 92067

[*] Notice: The portion of the term of this patent subsequent to Apr. 26, 2000 has been disclaimed.

[21] Appl. No.: 472,125

[22] Filed: Mar. 4, 1983

Related U.S. Application Data

[63] Continuation-in-part of Ser. No. 230,302, Jan. 30, 1981, Pat. No. 4,381,275.

[30] Foreign Application Priority Data

Jul. 29, 1982 [GB] United Kingdom ............ 8221909

[51] Int. Cl.³ ............................................. B29F 1/00
[52] U.S. Cl. ............................... 264/328.8; 264/255; 264/294
[58] Field of Search ............. 264/250, 328.8, 328.12, 264/328.13, 328.14, 328.16; 425/468, 570

[56] References Cited

U.S. PATENT DOCUMENTS 3,917,789  11/1975  Heisler ..................... 264/328.12
4,381,275  4/1983  Sorensen ................... 264/328.13

Primary Examiner—Donald Czaja
Assistant Examiner—V. Fischbach

[57] ABSTRACT

A method for controlling the dimensions of a hollow plastics product injection molded within the cooling cavity of a mold having a core section and a cavity section defining the cooling cavity therebetween and separated by a parting line comprising stabilizing the core section in the cooling cavity and comprising the steps of:

1. Injecting a first plastics material into the cooling cavity so that only a part of the cooling cavity is filled.
2. Cooling the injected first plastics material in the cooling cavity;
3. Injecting subsequent to injecting the first plastics material a second plastics material into the cooling cavity so that the cooled injected first plastics material in said part of the cooling cavity stabilizes the core section by impeding movement of the core section caused by injecting the second plastics material and whereby the injected second plastics material fills the cooling cavity and fuses with the cooled previously injected plastics material.

25 Claims, 9 Drawing Figures

CORE STABILIZATION BY SEQUENTIAL INJECTIONS

This is a continuation in part application of U.S. patent application Ser. No. 230,302 filed 01-30-81 entitled Stabilized Core Injection Molding of Plastic now U.S. Pat. No. 4,381,275. Priority is also claimed from U.K. patent application No. 8,221,909 filed 07-29-82 entitled "Stabilized Core Injection Molding.

FIELD OF THE INVENTION

This invention generally relates to injection molding of hollow plastic products and is particularly directed to stabilizing the core of the mold. The core is the mold part which forms the interior of a concave or hollow molded product.

CROSS REFERENCE TO RELATED APPLICATION

The application is cross-referenced to U.S. patent application Ser. No. 424,493 filed 09-27-82 entitled Core Centered Mold for Hollow Stackable Plastic Products by the same inventor.

DISCUSSION OF PRIOR ART

Heretofore, it has been a great problem to stabilize the core of molds used for injection molding hollow products of plastic with thin walls such as test tubes, drinking glasses, yogurt and margarine containers, flower pots, and pipes. In order to injection mold such products a large injection pressure is necessary which causes the core part of the mold to move in relation to the rest of the mold, resulting in products which do not have the intended dimensions.

Until now, no practical and satisfactory solution has been found to the problem and, therefore, such products as mentioned above are usually produced at a larger wall thickness than is necessary for the purpose of the product, in order to lowr the injection pressure to thereby reduce strain on the core part of the mold.

There have been proposals of methods of stabilizing the core of a mold for injection molding. However, these proposals have tended to be inexact and only partly compensate for core deflection, the degree of compensation achieved being very slight and unsatisfactory. One such proposal is disclosed in U.S. Pat. No. 4,264,295 to George A. Hingly where the molding of plastics material to form battery boxes is disclosed. In that specification formations are provided to hinder the initial flow of plastics material so that the cooling cavity around the free end of the core is filled first before the rest of the cavity. In this way the plastics material against the formations will supposedly tend to reduce deflection of the core as the plastics material contrives to flow into the rest of the cooling cavity.

At present, the main exception to the inadequacies of the prior art is an exact method where the core is held by pins or other such means in physical metal to metal contact with the cavity part of the cooling cavity by hydraulic means, which are removed at the last moment of injection.

One such method is described in Australian patent specification No. 17,557/70 of Louis Ryles, which discloses a mold having an axially movable core pin with a grooved abutment surface. In use the core pin is urged heavily against the injection gate to hold it firmly in the desired position and then plastics material is injected into the cooling cavity through the grooves in the abutment surface. Only once the whole of the cavity has been filled is the core pin moved axially to allow the end of the product to be molded. The problems with such a method are threefold, firstly, because the core pin is rigidly held by abutment with the cavity part of the mold, only products having a curved end may be molded. Secondly, the hard metal to metal contact to ensure rigidity of the core pin takes the polish off the cooling cavity, which is unacceptable for products such as test tubes; and thirdly, the large forces needed to stabilize the core necessitate a very large hydraulic cylinder and piston assembly, for which there is normally not enough room in the mold.

The present invention is not dependent upon the shape of the rim of the molded product, is not dependent on metal to metal contact in the cooling cavity, and is not dependent upon large hydraulic cylinders.

SUMMARY OF THE INVENTION

A method for controlling the dimensions of a hollow plastics product injection molded within the cooling cavity of a mold having a core section and a cavity section defining the cooling cavity therebetween and separated by a parting line comprising stabilizing the core section in the cooling cavity and being characterized by the steps of:

(a) injecting a first plastics material into the cooling cavity so that only a part of the cooling cavity is filled;

(b) cooling the injected first plastics material in the cooling cavity;

(c) injecting subsequent to injecting the first plastics material a second plastics material into the cooling cavity so that the cooled injected first plastics material in said part of the cooling cavity stabilizes the core section by impeding movement of the core section caused by injecting the second plastics material and whereby the injected second plastics material fills the cooling cavity and fuses with the cooled previously injected plastics material;

(d) cooling the injected plastics material in the cooling cavity to thereby solidify the fused unit; and (e) ejecting the solidified molded unit.

The method comprises at least one of the following two alternatives:

1. 
   Step (a) comprising the step of injecting the first plastic so that it does not completely cover the parting line, and
   Step (c) comprising the step of injecting the second plastic so that the parting line is completely covered.

And the second alternative:

2. 
   Step (b) comprising the step of cooling the first plastics material while discontinuing the filling of the cooling cavity for a period, and
   Step (c) comprising the step of injecting the second plastics material subsequent to said period.

Further objects and advantages of the invention will become apparent from a consideration of the drawings and ensuing description thereof.

BRIEF DESCRIPTION OF THE DRAWINGS

The invention will now be described by way of example with reference to the accompanying drawings in which.

DESCRIPTION OF THE PREFERRED EMBODIMENTS

Figure 1:
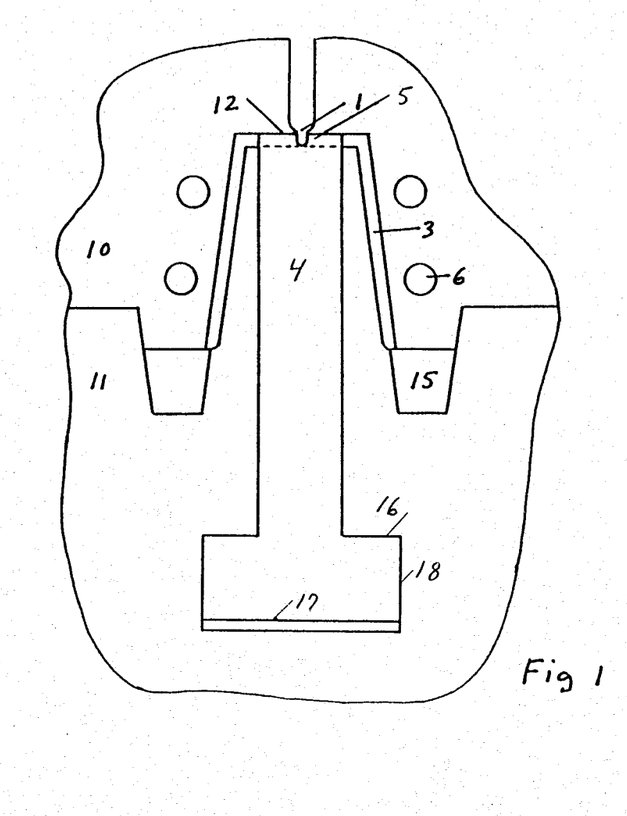
FIG. 1 is a schematic cross-sectional view of a first injection mold for the injection molding of a plastics product in accordance with the invention.
Figure 2:
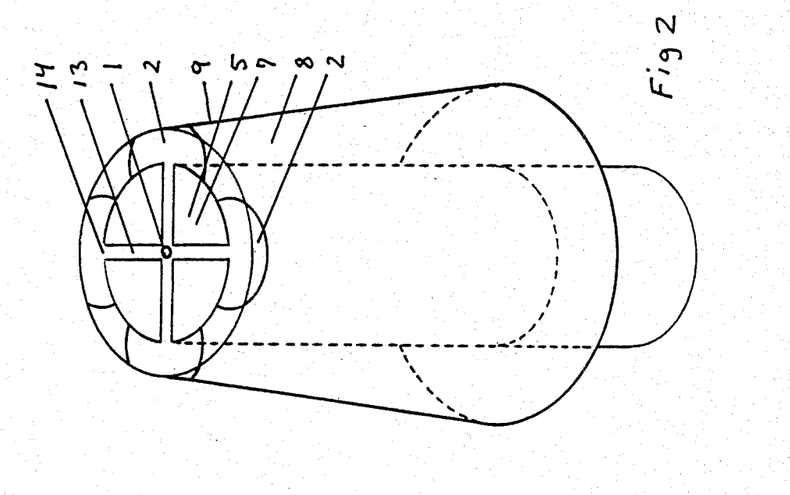
FIG. 2 is a schematic perspective view of the mold of FIG. 1 after the initial injection of first plastics material in accordance with the invention.

In the embodiment of FIGS. 1 and 2 a mold comprises a core part 11 with a core section 9 and a cavity part 10 defining a cooling cavity 3 therebetween in which a plastics injection molded product is formed. The plastics material for forming the product is injected into the cooling cavity 3 by means of an injection gate 1.

Positioned within the core part 11 of the mold is a retractable element 4 which, in its extended position shown in full lines in FIG. 1, projects into the cooling cavity 3 and abuts the cavity part 10. The surface of the retractable element 4 which abuts the cavity part 10 is generally circular and has four radially extending feed channels 13 evenly spaced around the periphery of the apex 12 of the core 9 radiating from a central position confronting the injection gate 1 and opening into the cooling cavity at 14. The retractable element 4 suitably is movable by conventional means such as hydraulic fluid acting upon the appropriate piston surfaces 16, 17 within a double-acting hydraulic cylinder 18 to cause, respectively, retraction or extension of the element 4. In its retracted position the retractable element 4 adopts the position indicated by dotted lines in FIG. 1 flush with the rest of the upper surface of the core part 11.

In use the retractable element 4 is fully extended and a first, small, quantity of hot molten plastics material is injected through the injection gate 1 into the cooling cavity 3. As the retractable element 4 abuts the cavity part 10, the first plastics material flows along feed channels 13 and issues into the cooling cavity 3 at the openings 14 forming respective first stabilizing regions 2. Because only a relatively small quantity of the first plastics material is injected at a low pressure the whole cooling cavity 3 does not fill up but the regions 2 as they harden are sufficient to locate the core part 11 substantially centrally. The element 4 is then retracted by the hydraulic means to provide a retraction region 5 which connects the gate 1 to a secondary region 8, before the first plastics material fully solidifies, and a relatively large amount of second plastics material is injected through the injection gate 1, at high pressure, to fill the unfilled portion of the cooling cavity 3. The second plastics material passing to the remainder of the cooling cavity 3 through retraction passages 7 defined between the positions of the feed channels 13 on retraction of the retractable element 4. The first and second plastics materials then fuse together on cooling by cooling means 6 so as to form a plastics molded product which may be ejected from the core part 11 by stripper means 15.

During the molding process the core part 11 is stabilized against lateral deflection solely by the injection of the first plastics material and not by the abutment with the cavity part 10.

Figure 3:
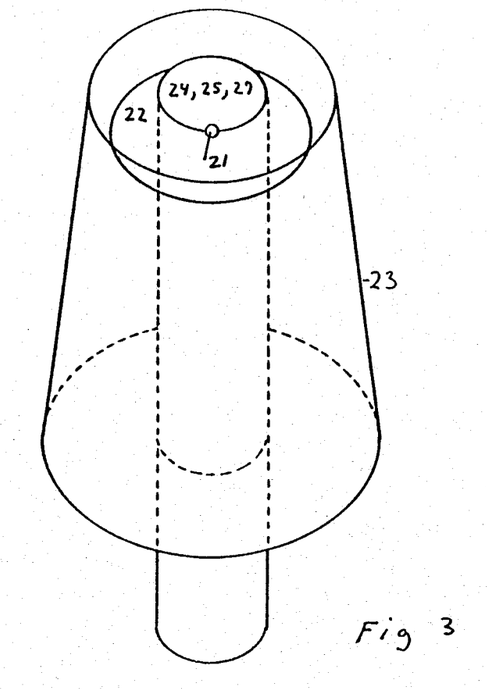
FIG. 3 is a schematic perspective view of the second injection mold at the same stage in the process as illustrated in FIG. 2.

In FIG. 3 a similar arrangement is disclosed except that the injection gate 21 is aligned with the edge of the retractable element 24 so that, on injection of first plastics material, a single stabilizing region 22 is formed. Then, upon retraction of the element 24, the whole of the retraction area 25 defines a retraction passage 27 through which second plastics material may flow to fill the remainder of the cooling cavity 3.

Figure 4:
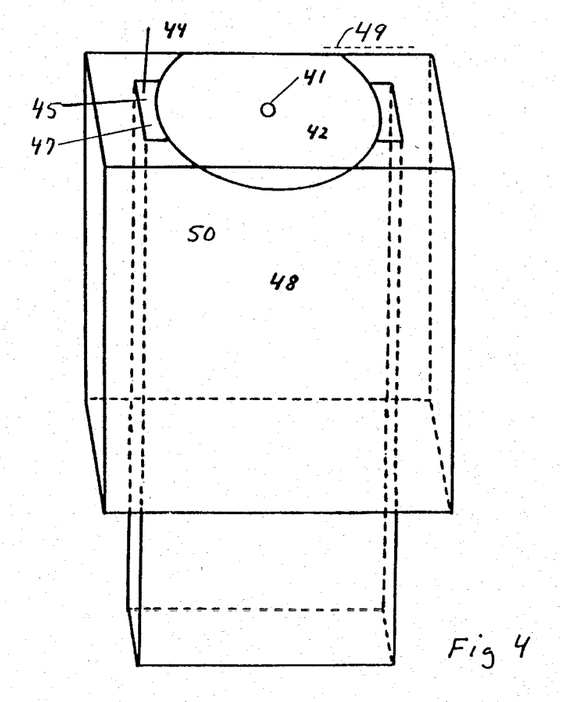
FIG. 4 is a schematic perspective view of a third injection mold at the same stage in the process as illustrated in FIG. 2.

In the arrangement of FIG. 4 the injection gate 41 is aligned centrally of the retractable element 44. However, instead of its surface abutting the cavity part 49 in its extended position as in the first two embodiments, the surface lies flush with the cooling cavity 48 as defined by the core part. Thus, on injection of first plastics material, a single stabilizing region 42 is formed about the injection gate 41 and overlapping the sides of the core part. The retractable element 44 is then retracted to provide a temporary retraction area 45 which defines a flow path 47, partly positioned beneath the region 42, and which partly consists of molten plastic which has not completely solidified near the gate 41 for the second plastics material to pass through to fill the rest of the cooling cavity. However, during or immediately after the injection of the second plastics material the retractable element 44 is extended to shape the product to the desired controlled dimensions before the first and second plastics solidify and fuse together.

Figure 5:
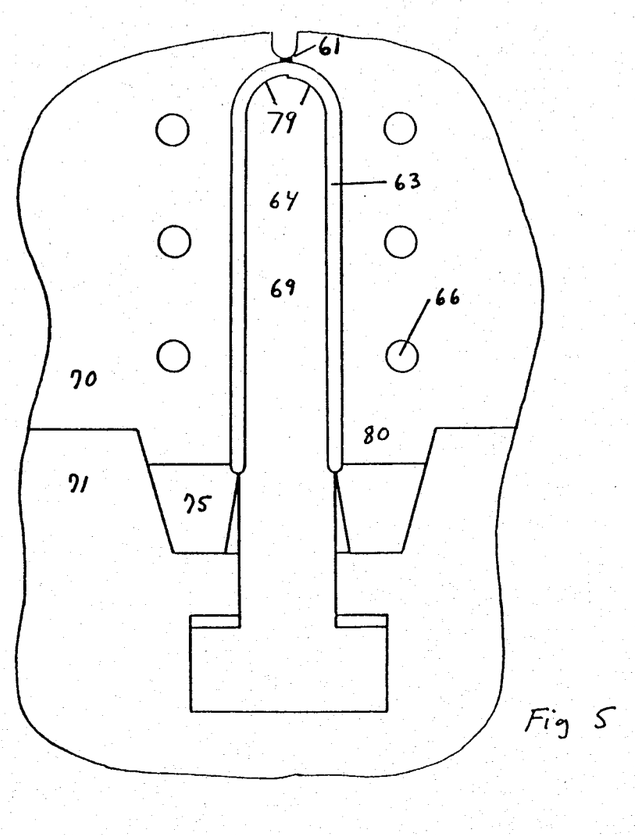
FIG. 5 is a schematic cross-sectional view of a fourth injection mold for the injection molding of a plastics product in accordance with the invention.
Figure 6:
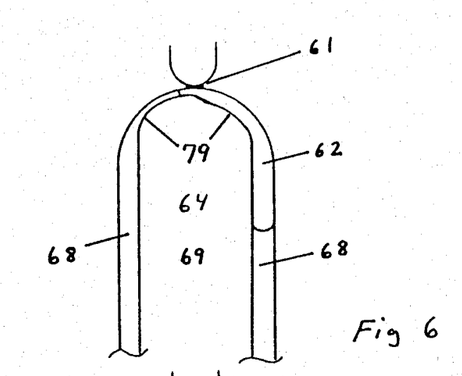
FIGS. 6 and 7 are schematic fragmentary side views of the mold illustrated in FIG. 5 at subsequent stages of the process.
Figure 7:
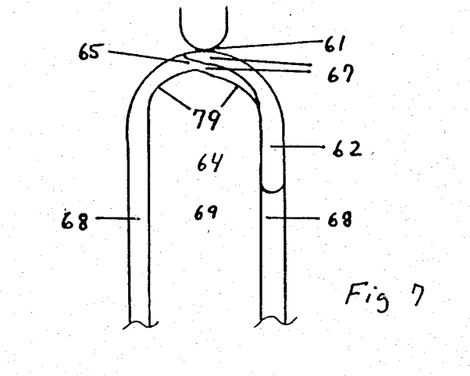

In the embodiment of FIGS. 5, 6 and 7 a mold for forming a plastics test tube is illustrated. The mold comprises a cavity part 70, and a core part 71 meeting at parting line 80, and the core part having a movable core 69, the upper surface of which forms the retractable element 64. The core 69 suitably is movable by hydraulic means in the same manner as that described with reference to FIG. 1 and defines with the cavity part 70, a cooling cavity 63 cooled by conventional cooling means 66. In this embodiment the retractable element 64, formed in this case by the whole core 69, is first positioned fully extended, but the apex 79 of the core 69 is not abutting the cavity past 70, as shown in FIG. 6 whereupon first plastics material is injected through the injection gate 61 to form a first stabilizing region 62. This region of first injected plastic does not touch or cover any part of the parting line 80. The element 64 is then retracted to leave a retraction region 65 below the gate 61 for communication with the rest of the cooling cavity 68. Second plastics material is now injected through the molten first plastics which has not completely solidified by cooling and passes, via the retraction passage 67, to fill the remainder of the cooling cavity 68. Once the first and second plastics materials have solidified and fused together to form a test tube of controlled dimensions, the test tube may be ejected by ejector means 75.

It will thus be understood that in the first, second and fourth embodiments the retraction regions form part of the cooling cavity in which second plastics materials are allowed to solidify to complete the product being formed. On the other hand, in the third embodiment, the retraction regions do not form part of the cooling cavity per se and must be extended before the second plastics material solidifies.

In all the embodiments of the invention the core part is stabilized by the stabilizing region or regions formed by the first plastics material thereby impeding any lateral deflection of the core during subsequent injection of second plastics material. Thus, the stabilizing is not dependent upon contact of the retractable element with the surface of the cavity part.

Figure 8:
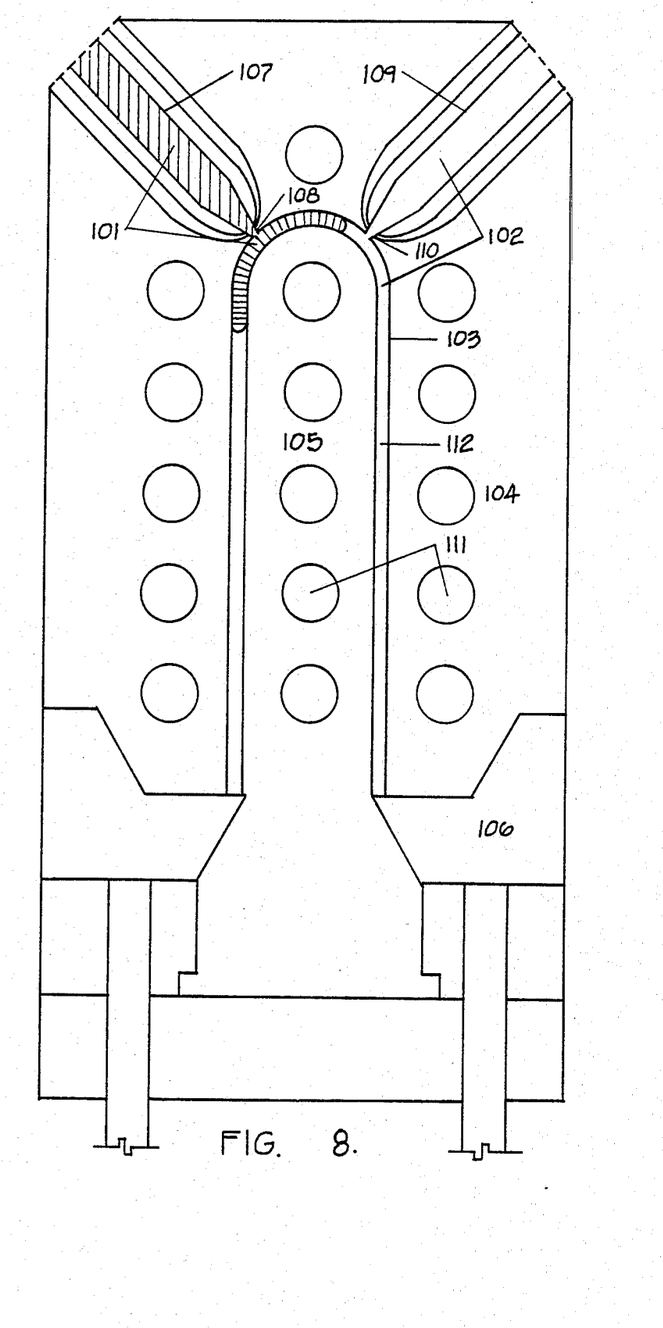
FIGS. 8 and 9 illustrate schematic cross-sectional views of subdivisions of molds for injection molding of plastic according to the invention. The subdivisions are positioned traditionally in molds for injection molding.

FIG. 8 This figure illustrates a chilling cavity 103 enclosed by a cavity part 104, a core part 105 which is centrally positioned in relation to the cavity part 104, and an ejector sleeve 106. A first hot runner 107 with a first restriction gate 108 leading to the chilling cavity 103 and a second hot runner 109 with a second restriction gate 110 also leading to the chilling cavity 103. Both the cavity part 104 and the core part 105 contain a cooling system 111. A first plastic 101 such as polystyrene is positioned in the hot runner 107 and part of the chilling cavity 103. A second plastic 102 also such as polystyrene, is positioned in the hot runner 109 and the remainder of the chilling cavity 103. The part of first plastic 101 and the second plastic 102 which is positioned in the chilling cavity 103 makes up a molded product 112.

The operation of a first preferred embodiment of this invention as illustrated in FIG. 8 is as follows: a production cycle is started by injecting a hot molten first plastic 101 from the first hot runner 107 through the first restriction gate 108, thereby entering the chilling cavity 103. The injection pressure of the hot molten first plastic 101 is adjusted at a low level so that the cavity 103 does not fill up and so that the injected first plastic 101 does not obstruct injection from the second restriction gate 110. The injected first plastic 101 is cooled by the cooling system 111, but before the injected first plastic 101 is completely solidified, a hot molten second plastic 102 is injected from the second hot runner 109 through the second restriction gate 110 and thereby also enters the chilling cavity 103. The injection pressure of the hot molten second plastic 102 is adjusted at a higher level than the low level of the injection pressure of the hot molten first plastic 101 whereby the injected second plastic 102 fills the cavity and fuses with the previously injected first plastic. When the hot molten first plastic 101 was injected into the chilling cavity 103, the injection pressure was adjusted at a low level, but even at this low level of injection pressure, the injected first plastic 101 causes a slight movement of the core part 105 away from the first restriction gate 108 in relation to the cavity part 104, but since the second hot molten plastic 102 is injected before the injected first plastic is completely solidified, the core is forced back to its original central position by the higher level injection pressure of the injected second plastic 102. As the core is forced back, the cooled, not completely solidified injected first plastic 101, impedes the movement of the core part 105 caused by the higher level injection pressure of the injected second plastic 102. Also since the hot molten second plastic 102 is injected before the injected first plastic 101 is completely solidified, the injected first plastic 101 fuses better with the injected second plastic 102 and time is saved in the production cycle since it is not necessary to wait with injecting the hot molten second plastic 102 until the injected first plastic 101 is completely solidified. Both the first injected plastic 101 and the second injected plastic 102 are cooled in the chilling cavity 103 by the cooling system 111, thereby creating a solidified fused molded product 112. The molded product 112 is ejected by the ejector sleeve 106 in the traditional manner for injection molding. The production cycle is hereafter repeated. It is possible in some other embodiment to have two or more differently placed restriction gates taking the function of the second restriction gate 102.

FIG. 9

Figure 9:
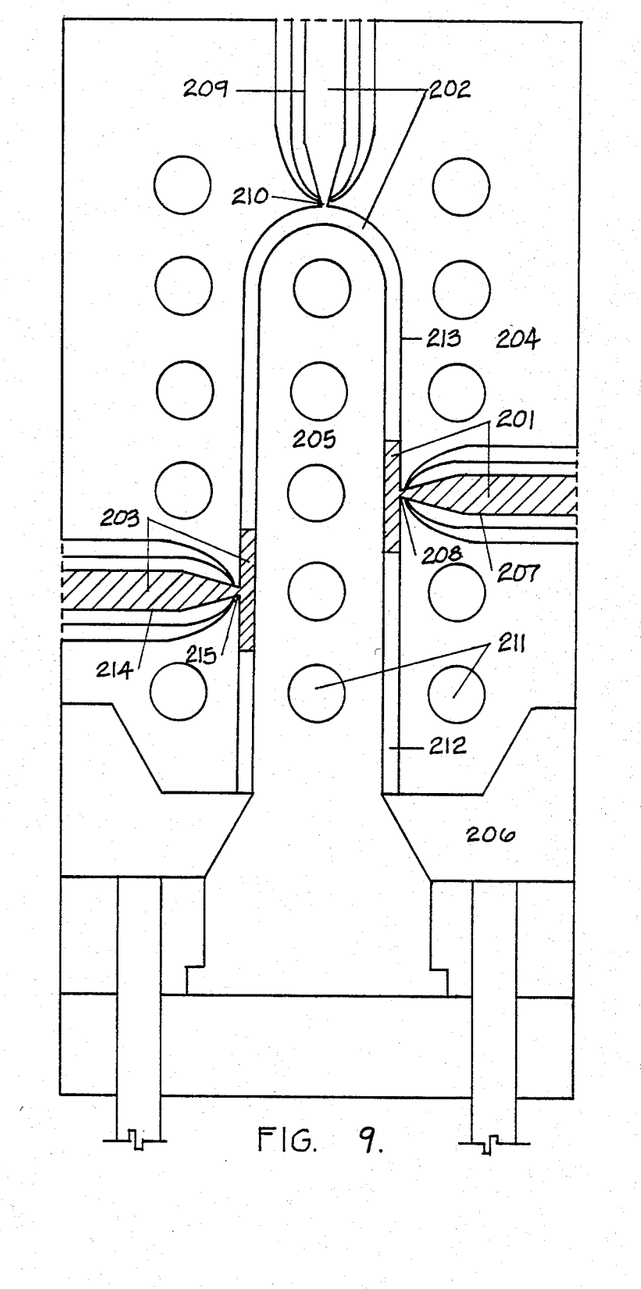

This figure illustrates a chilling cavity 213 enclosed by a cavity part 204, a core part 205 which is centrally positioned in relation to the cavity part 204, and an ejector sleeve 206. A hot runner 207 with a restriction gate 208, a hot runner 214 with a restriction gate 215, and a hot runner 209 with a restriction gate 210. All the restriction gates 208, 215, 210 leading to the chilling cavity 213. Both the cavity part 204 and the core part 205 contain a cooling system 211. A first plastic 201 such as polypropylene, is positioned in the hot runner 207 and a part of the chilling cavity 213. A second plastic 203 also such as polypropylene, is positioned in the hot runner 214 and another part of the chilling cavity 213. A third plastic 202 also such as polypropylene, is positioned in the hot runner 209 and the remainder of the chilling cavity 213. The part of the first plastic 201, the second plastic 202, and the third plastic 203 which is positioned in the chilling cavity 213 makes up a molded product 212. The expressions first, second and third plastic neither refer to the order in which they are mentioned in this description nor refer to the order in which they are applied, but are only used to differentiate and name three different masses of plastic.

The operation of a second preferred embodiment of this invention as illustrated in FIG. 9 is as follows: A production cycle is started by injecting a hot molten first plastic 201 and a hot molten third plastic 203 simultaneously from the hot runner 207 and the hot runner 214 respectively through the restriction gate 208 and the restriction gate 215 respectively through the restriction gate 208 and the restriction gate 215 respectively, thereby entering the chilling cavity 213. The injection period of the hot molten plastic 101 and 103 is adjusted equally at a short period so that the cavity does not fill up and so that the first and third injected plastic 201 and 203 does neither obstruct injection from the second restriction gate 210, nor obstruct injection from each others restriction gates 208 and 215. The injected first and third plastic 201 and 203 respectively, is cooled by the cooling system 211, but before the injected first plastic 201 and injected third plastic 203 are completely solidified a hot molten second plastic 202 is injected from the second hot runner 209 through the second restriction gate 210 and thereby also enters the chilling cavity 213. The injection period of the hot molten second plastic 202 is adjusted at a longer period than the short period of the injection of the hot molten first and third plastic 201 and 203 respectively, whereby the injected second plastic 202 fills the cavity and fuses with the previously injected first and third plastic 201 and 203 respectively.

The first gate 208 and the second gate 215 are positioned on opposite sides of the core, whereby any movement of the core caused by the injection pressure of the first and third plastic 101 and 103 respectively, while this plastic is flowing into the cavity 213, is at least partly balanced and the movement thereby at least partly counteracted. It is possible in this fashion in some other embodiment to have three or more simultaneously injecting restriction cavities on different sides of the core which at least partly balance each other and which do not fill up the entire cavity.

Since the hot molten second plastic 202 is injected before the injected first and third plastic 201 and 203 respectively is completely solidified, the injected first and third plastic 201 and 203 respectively fuses better with the injected second plastic 202 and time is saved in the production cycle since it is not necessary to wait with injecting the hot molten second plastic 202 until the injected first and second plastic 201 and 203 is completely solidified. Even though the hot molten second plastic 202 is injected before the injected first and third plastic 201 and 203 respectively is completely solidified, the partly solidified injected first and third plastic 201 and 203 respectively impedes any movement of the core part 205 caused by injecting the second hot molten plastic 202. The first, second and third plastic 201, 202 and 203 respectively, are cooled in the chilling cavity 213 by the cooling system 211, thereby creating a solidified fused molded product 212. The molded product is ejected by the ejector sleeve 206 in the traditional manner for injection molding. The production cycle is hereafter repeated.

The operation of a third preferred embodiment of this invention is also illustrated in FIG. 9 and is as follows: A production cycle is started by injecting a hot molten third plastic 203 from the third hot runner 214 through the third restriction gate 215, thereby entering the chilling cavity 213. The injection pressure of the hot molten third plastic 203 in the third hot runner 214 is at a high level but the third restriction gate 215 has a small cross-sectional area which impedes the flow of the hot molten third plastic 203 through the restriction gate 215 so that the cavity 213 does not fill up and so that the injected third plastic 203 does not obstruct injection from the first restriction gate 208 and the second restriction gate 210. The injected third plastic is cooled by the cooling system 211, but before the injected third plastic 203 is completely solidified, a hot molten first plastic 201 is injected from the first hot runner 207 through the restriction gate 208 and thereby also enters the chilling cavity 213. The injection pressure of the hot molten first plastic 201 in the first hot runner 207 is at a high level like the injection pressure of the hot molten third plastic 203 in the third hot runner 214 and the first restriction gate 208 also has a small cross-sectional area which also impedes the flow of the hot molten first plastic 201 through the restriction gate 208 so that the cavity 213 does still not fill up, and the injected first plastic 201 does not obstruct injection from the second restriction gate 210. The injected first plastic 201 does not in this embodiment fuse with the previously injected third plastic 203, but in other embodiments this is possible. When the hot molten third plastic 203 was injected into the chilling cavity 213, the flow was impeded by the small cross-sectional area of the third restriction gate 215, but even at this impeded flow the injected third plastic 203 causes a slight movement of the core part 205 in a direction away from the third restriction gate 215 in relation to the core part 204, but since the hot molten first plastic 201 is injected before the hot molten third plastic 203 is completely solidified, the core is forced back to its original central position by the injection pressure of the injected first plastic 201. As the core is forced back the cooled, not completely solidified injected third plastic 203 impedes the movement of the core part 205 caused by the injection pressure of the injected first plastic 201. Hereafter, a hot molten second plastic 202 is injected from the second hot runner 209 through the second restriction gate 210 and thereby also enters the chilling cavity 213.

The second restriction gate 210 does not have a small cross-sectional area so the flow of the second hot molten plastic 202 is not particularly impeded whereby the injected second plastic 202 fills the cavity and fuses with the previously injected third plastic 203 and previously injected first plastic 201. As the second hot molten plastic 202 is injected through the second restriction gate 210 into the chilling cavity 213, the cooled injected third and first plastic 203 and 201 respectively impede any movement of the core part 205 caused by the pressure of the injected second plastic 202. The first, second and third injected plastic 201, 202 and 203 are not cooled in the chilling cavity 213 by the cooling system 211, thereby creating a solidified fused molded product 212. The molded product 212 is ejected by the ejector sleeve 206 in the traditional manner for injection molding. The production cycle is hereafter repeated.

While the above description contains many specificities, these should not be construed as limitations on the scope of the invention, but rather as an exemplification of six preferred embodiments thereof. Many other variations are possible. For example, there may be more than one core, more than one retractable element which may be retracted and extended at various periods in the molding cycle, or the mold may be multi-cavity mold having more than one cooling cavity.

The invention may be used for the production of pipes, and it is possible to use more than one gate through which to inject for the purposes explained in the descriptions. Accordingly, the scope of the invention should be determined not by the embodiments illustrated but by the appended claims and their legal equivalents.

I claim:

1. A method for controlling the dimensions of a hollow plastics product injection molded within the cooling cavity of a mold having a core section and a cavity section defining the cooling cavity therebetween and separated by a parting line comprising stabilizing the core section in the cooling cavity and being characterized by the steps of:
   (a) injecting a first plastics material into the cooling cavity so that only a part of the cooling cavity is filled and so that the injected first plastics material does not completely cover the parting line;
   (b) cooling the injected first plastics material in the cooling cavity;
   (c) injecting subsequent to injecting the first plastics material a second plastics material into the cooling cavity so that the cooled injected first plastics material in said part of the cooling cavity stabilizes the core section by impeding movement of the core section caused by injecting the second plastics material and whereby the injected second plastics material fills the cooling cavity to thereby completely cover the parting line and fuses with the cooled previously injected plastics material;
   (d) cooling the injected plastics material in the cooling cavity to thereby solidify the fused unit; and
   (e) ejecting the solidified molded unit.

2. A method for controlling the dimensions of a hollow plastics product injection molded within the cooling cavity of a mold having a core section and a cavity section defining the cooling cavity therebetween and separated by a parting line, comprising stabilizing the core section in the cooling cavity, and being characterized by the steps of:

(a) injecting a first plastics material into the cooling cavity so that only a part of the cooling cavity is filled;

(b) cooling the injected first plastics material in the cooling cavity while discontinuing the filling of the cooling cavity for a period;

(c) injecting subsequent to said period a second plastics material into the cooling cavity so that the cooled injected first plastics material in said part of the cooling cavity stabilizes the core section by impeding movement of the core section caused by injecting the second plastics material and whereby the injected second plastics material fills the cooling cavity and fuses with the cooled previously injected plastics material;

(d) cooling the injected plastics material in the cooling cavity to thereby solidify the fused unit; and (e) ejecting the solidified molded unit.

3. A method according to claim 1 or 2 wherein the injection pressure of the first plastic is less than the injection pressure of the second plastic.

4. A method according to claim 1 or 2 wherein the period of injecting the first plastic is less than the period of injecting the second plastic.

5. A method according to claim 1 or 2 wherein the first plastic has the same chemical composition as the second plastic.

6. A method according to claim 1 or 2 wherein the injection of the second plastic is started before the injected first plastic is completely solidified.

7. A method according to claim 1 or 2 wherein a relatively smaller amount of first plastics material is injected into the cooling cavity as compared with the quantity of the second plastics material.

8. A method according to claim 1 or 2 wherein the first plastic enters the cooling cavity at a lower pressure than the second plastic does.

9. A method according to claim 1 or 2 wherein the apex of the core section is not at any time during the molding cycle supported from transverse deflection by the cavity section.

10. A method according to claim 1 or 2 wherein the apex of the core section is not at any time during the molding cycle in contact with the cavity section.

11. A method according to claim 1 or 2 comprising the additional step of:

(f) injecting a third plastics material into the cooling cavity subsequent to beginning the injection of the first plastics material and prior to ending the injection of the second plastics material.

12. A method according to claim 1 or 2 wherein the first and/or the second plastics material are injected through one or more gates.

13. A method according to claim 12 wherein the first plastics material is injected through more than one gate.

14. A method according to claim 12 wherein the first plastics material is injected through different gate/s than the second plastics material.

15. A method according to claim 12 wherein the first plastic material is injected through the same gate/s as the second plastic material.

16. A method according to claim 14 wherein the first plastics material is injected through a first gate and the second plastics material is injected through a second gate.

17. A method according to claim 16 wherein the injection pressure of the first plastic in a first runner is approximately the same as the injection pressure of the second plastic in a second runner, but the first gate has a smaller cross-sectional area than the second gate.

18. A method according to claim 12 comprising the additional step of:

(f) retracting, subsequent to step (a), retractable partition/s of said core and/or cavity sections to provide flow path/s for the second plastics material between the injection gate/s and the unfilled portion of the cooling cavity.

19. A method according to claim 18 wherein the flow path/s form part of the cooling cavity and remains filled with second plastics material.

20. A method according to claim 18 wherein at least part of the flow path/s does not form part of the cooling cavity and wherein the retractable portion is extended to define the cooling cavity during or after injection of the second plastics material.

21. A method according to claim 18 wherein the retractable portion comprises movable part/s of the core section.

22. A method according to claim 18 wherein the retractable portion comprises the whole of the core section.

23. A method according to claim 18 wherein step (f) comprises:

(g) creating only one flow path and thereby impeding any movement of the core with some of the first quantity of plastic which is located transversely across the apex of the core from the retraction passage.

24. A method according to claim 18 where the flow path/s (7) partly consist of molten plastics material which has not completely solidified by cooling.

25. A method according to claim 15 wherein all the injected plastic is injected through a single gate.

* * * * *